United States Patent Office 3,505,499
Patented Apr. 7, 1970

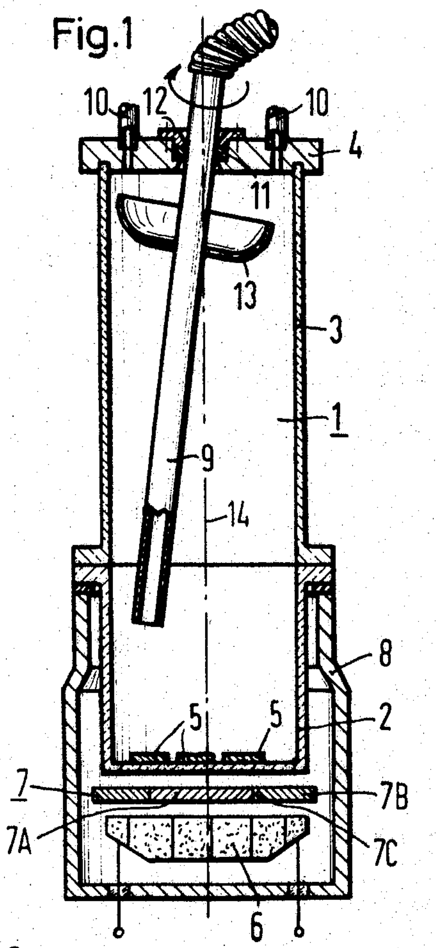
Fig. 2
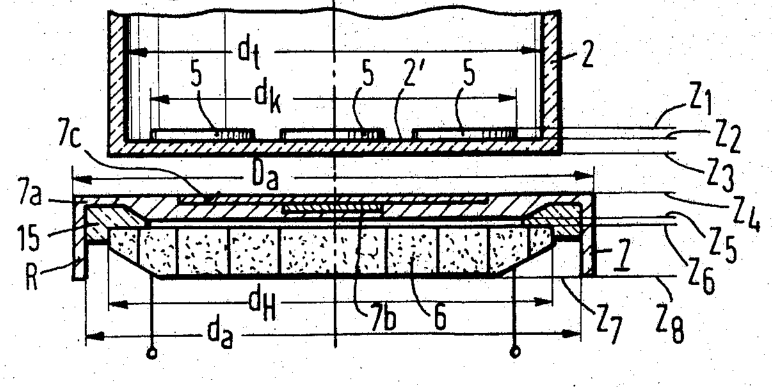

3,505,499
DEVICE FOR THERMAL PROCESSING OF DISC SHAPED OBJECTS FOR SEMICONDUCTORS

Albert Walther, Garentberg, Germany, assignor to Siemens Aktiengesellschaft, Berlin, Germany, a corporation of Germany Filed Apr. 4, 1968, Ser. No. 718,881
Int. Cl. F27d *11/00*
U.S. Cl. 219—439 14 Claims

ABSTRACT OF THE DISCLOSURE

An apparatus for thermal processing of semiconductor discs, whereby the discs being processed are arranged on the bottom of a treatment chamber and are heated to processing temperature by means of a heating device located beneath the bottom of the chamber, extending areally with its upper surface parallel to the discs being treated. The apparatus is characterized by a temperature adjusting or balancing plate, arranged between the heater and the bottom of the processing vessel and extending at least with its middle portion parallel to the bottom of the processing vessel and so constructed that the axial heat flow which traverses the center portion of the balancing device encounters a stronger impediment in the center of said parallel portion than at its periphery, while the radial heat flow proceeding from the interior to the outside encounters an impedance in at least some places.

Epitaxy is frequenly used for producing semiconductor components. This technique consists in heating discs or wafers of semiconductor crystals, particularly monocrystals, to a high temperature below the melting point of the semiconductor, while simultaneously passing a reaction gas across the discs. Semiconductor material, usually monocrystalline, thus precipitates upon the semiconductor discs. The semiconductor discs are heated mainly by electrical means, for example by maintaining the wafers, during the precipitation process, in direct contact with a carrier and heater consisting of heat resisting, conducting material through which passes an electrical heating current. Alternatively, the wafers may contact an insulating intermediate layer which in turn contacts the carrier. Of course, other heating possibilities also exist. For many known reasons, the preferred reaction gas is a halogen or a halogen hydride of the element to be produced. This active component is preferably diluted with hydrogen, and possibly with an inert gas. Frequently, specific concentrations of dopants are also added.

The production of semiconductor components by epitaxy requires a high uniformity of the precipitated layers as to thickness and doping. One of the prerequisites necessary to achieve this requirement is an exceptionally uniform heating of the semiconductor discs being processed.

A previously suggested apparatus is comprised of a cup shaped container, primarily of quartz, having a flat bottom. The discs to be coated are placed on the bottom of the reaction vessel or container, preferably in a uniform arrangement. The discs are heated by a heated, arranged beneath the bottom of the reaction vessel. Said heater is areally extended and preferably heated by electricity. In most cases, this heater is comprised of spirally wound or meander shaped slit conductor consisting preferably of graphite, carbon or an inert heat-resistant metal. It is also recommended to place a heat equalizing plate between the bottom of said reaction vessel and the heating device, which extends parallel to the bottom of the reaction vessel. Such devices were described copending patent applications Ser. Nos. 515,304 and 523,233, filed Dec. 21, 1965 and Jan. 26, 1966 respectively.

The present invention relates to a further development of the aforementioned devices.

To utilize the present invention, however, it is not absolutely necessary that the semiconductor material precipitated upon the discs to be coated, is derived from a reaction gas. Rather, the semiconductor material may be applied, for example, by vapor deposition and will condense in a monocrystalline state by appropriate dimensioning of the vapor density of the produced semiconductor material and a sufficiently high, uniform temperature of the discs to be coated. A uniform processing temperature for the semiconductor discs to be treated is of particular importance if doping material is to be indiffused from a gaseous phase into semiconductor crystals. Other possibilities for utilizing the present invention consist, for example, in a simultaneous, series alloying of equally dimensioned semiconductor devices, for the purpose of producing alloyed electrodes with or without p-n junctions. All such devices may be improved and further developed in the sense of the present invention.

My invention has as its object a device for the thermal processing of disc shaped objects for semiconducting purposes, whereby the discs to be processed are arranged at the bottom of a reaction chamber and are heated to the processing temperature from below by a heating device which is areally expanded and has its upper surface parallel to the discs being processed. The device of the present invention is characterized by a temperature balancing body, more particularly a temperature adjusting plate, arranged between the heating device and the bottom of the processing vessel, extending at least with its middle portion parallel to the bottom of the treatment vessel and so designed that the flow of heat traversing the middle portion of said adjusting body proceeds axially, i.e., in a direction from the heating device toward the discs to be processed, and meets with a stronger impediment in the center of said temperature adjusting device than at its periphery, while the radial heat flow proceeding from the inside toward the outside is subjected to an impediment through measures which are provided at least in certain places.

FIG. 1 shows an embodiment of a device according to the present invention;

FIG. 2 shows another embodiment of a portion of the device;

FIG. 3 shows still another embodiment with respect to a portion of the device; while

Figure 3:
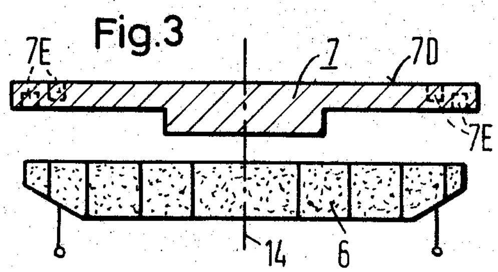

While the device of FIG. 1 serves primarily for epitactic coating of semiconductor discs, it can, however, also be used for doping semiconductor discs from the gaseous phase or for producing alloyed-in electrodes on semiconductor discs.

In the apparatus of FIG. 1 a cylindrical reaction chamber 1 is formed by a pot- or cup-shaped bottom portion 2 and a cylindrical upper portion 3, both preferably consisting of quartz. The top of the reaction chamber is closed by a cover 4 of metal, such as stainless steel. The substrates 5 to be provided with epitaxial layers are placed flat upon the bottom of the pot shaped lower portion 2.

The discs are heated from below, by means of an electrical heater element 6 through a heat equalizing plate 7. The lower portion 2 of the reaction chamber 1, as well as the heating device 6, 7 are preferably located in a cooled heating pot 8, consisting of metal, as had been described in copending patent application Ser. No. 515,304.

The supply of fresh reaction gas, as well as the removal of the exhausted reaction gas, is preferably effected from above. To this end, I provide a gas inlet 9, extending downwardly centrally through the metal cover 4. Positioned concentrically to the gas inlet are a plurality of escape openings for the gas 10. In the example, the gas inlet is removably positioned in the cover 4. At the same time a hermetic connection between the pipe 9 and the cover 4 is ensured. This is effected by a seal 11, comprised of chemical and heat resistant elastic material which annularly encloses the pipe 9. In the example, said seal 11 is pressed, by a pressure ring 12, against an abutment in the cover 4 as well as against the inlet 9. The inlet pipe 9 may be moved from without the reaction vessel, in the sense of application Ser. No. 523,233. The gas inlet pipe 9 is enclosed within the reaction chamber, by a protective sleeve 13, which is turned inside out in the shape of a cup, and is rigidly connected thereto. The sleeve serves as a radiation shield when the cover 4 becomes too hot. Furthermore, it catches the particles which form primarily on the cover 4 and act as impurity atoms, in cases where the device is used for epitactic purposes. As previously stated, the reaction chamber is preferably shaped as a circular cylinder. Finally, it is recommended, in order to keep the reaction gas pure, that, in instances when the lower portion 2 and the upper portion 3 of the reaction vessel can be separated from one another, the gas supply pipe 9 should extend into the lower portion 2.

FIG. 2 shows the arrangement of portions 2, 5, 6 and 7 of the device shown in FIG. 1, in another embodiment. The bottom of the reaction vessel, indicated here as 2′, is preferably of uniform thickness, and consists of quartz. If the device is to be used for processing silicon discs or the like, it is preferable that those parts of the device which are of $SiO_2$, at least insofar as they are to be heated to high temperatures during the operation of the device, are the most absorption-free $SiO_2$ possible, in a spectral range of 2.6 to 2.8$\mu$. The temperature adjusting body 7, the bottom of the reaction vessel 2 and the heating device 6 are preferably arranged symmetrically to the vertical central axis 14 of the device. At any rate, the cross section geometry of the reaction vessel 2 should correspond to that of the temperature adjusting plate 7 and the heating device 6. If the cross section of the reaction vessel 2 is circular, the horizontal cross sections of 7 and 6 should also be circular, provided one disregards the understructure meandor heater present, for example. The coiled, preferably in one plane, and preferably circulator heater, comprising a heat resistant material, such as for example, graphite, molybdenum, tungsten, tantalum, favorably possesses a cross section reduction at its periphery to increase the peripheral temperature. The heating device is brought to the high temperature, required for the various processes, by an electric current which is preferably supplied by electrodes. The coils of the conductor, forming the heater, may be spiral or meander shaped. The windings of the heater 6 are cut off at their upper surface in a plane, running in parallel to the discs 5, as well as to the bottom of the reaction chamber. By reducing the cross section of the conductor of the heating member toward its periphery, only a partial elimination of the peripheral drop of the temperature can be effected in the region above the heater.

The measures provided by the present invention will be described in greater detail below. Aside from these provisions, it is preferred that the temperature adjusting plate 7, which is comprised of radiation absorbing material, for example graphite or pyrographite, bend vertically downward, from its central horizontal course, so as to laterally enclose the heater 6, as shown in FIG. 2.

The temperature adjusting plate serves above all to compensate the temperature effects caused by a stronger peripheral radiation and, if necessary, to balance a "striation" in temperature distribution, produced by the understructure of the heater, at the location of the semiconductor discs 5 being processed, above the heater.

In accordance with the present invention, the axial heat conducting properties of the temperature adjusting plate 7 are considerably higher at the symmetry axis 14 than the axial heat conducting properties at the periphery R of the horizontally extending portion of said temperature adjusting plate 7. To effect this, the temperature adjusting plate 7 may comprise, for example, a number of circular adjoining portions, arranged in concentric relation to each other and to the symmetry axis of the device, and produced of varying materials, so that the central disc shaped portion possesses the lowest axial heat conducting properties, whereas the axial heat conducting property of the successively adjoining annular portions successively increases at greater distances from the center. It is sufficient, if the temperature adjusting plate consists of only two regions of variable material, whereby the inside circular portion has the smaller heat conductivity and the outer annular portion, which surrounds the circular disc shaped inside portion and forms a single piece therewith, has the higher heat conductivity. FIG. 1 shows such a possibility. The temperature adjusting plate is comprised of an inner portion 7A and of an outer portion 7B. The material of the inner portion 7A has the smaller heat conductivity, in an axial direction, while the heat transfer property of the annular outer portion 7B, by comparison, is higher in an axial direction. The circular cylinder shaped butt junction 7C automatically ensures that the heat, flowing from 7A to 7B, meets a considerable radial impediment.

This results in the simple design in accordance with this inveniton, of the temperature adjusting plate 7, even when the axial strength in the horizontal part of the temperature adjusting plate 7 has the same value all over. If necessary, this strength may be greater in the central portion 7A than the annular outer portion 7B. This further acts in the sense of an obstruction to the radial temperature flow, in the temperature adjusting plate 7.

It is also possible to construct the temperature adjusting plate purely by geometrical modifications. The temperature adjusting plate will then consist of a single piece constituting, for example, graphite, and will show, for example, in a device with a circular cylinder symmetry a geometry for all meridian sections, which is illustrated in FIG. 3. The central portion is thicker than the peripheral portion 7D. As a result, the axial temperature flow of such a temperature adjusting plate is more obstructed in the center portion than it is in the thinner edge portion 7D, while the radial temperature flow from the inside out meets with a definite impediment.

The outer, ring shaped portion 7A around the embodiment specially illustrated in FIG. 1, may be comprised of normal graphite, while the inside circular disc shaped portion 7B is so cut from pyrographite that the direction with the smallest heat conductivity is parallel to the symmetry axis 14 of the device. The radial heat flow may be further reduced by additional geometrical modifications, for example through grooves or holes 7E (FIG. 3) or through axial holes or the like.

Another measure was used for the device shown in FIG. 2, to achieve the desired goal. The temperature balancing plate 7, which is comprised of graphite or carbon, for example, is provided with a central, disc insert 7*b* within main portion 7*a*. The latter has a central recess 7*c*, symmetrical with the symmetry axis 14, for receiving the disc shaped insert 7*b*. This recess 7*c* may be stepped and may either be completely filled or, as in the example of FIG. 2, partly filled with a material of higher resistance.

Often, it is sufficient, in connection with the embodiment shown in FIG. 2, if the disc shaped portion 7*b* is comprised of the same material as the main portion 7*a* of the temperature adjusting plate 7, the disc insert 7*b* may be of pyrographite, with a smaller heat conductivity, and an axis corresponding to the symmetry axis 14 of the device. In a further development of this last embodiment, the recess 7*c* may consist of a central, deeper portion and of a flat outer portion. The disc shaped insertion 7*b* is then located only in the deeper central portion, in a manner seen from FIG. 2. The shallower portion of the recess may contain another disc, comprised of conventional graphite. This obviously results in a stepped construction of the radial heat flow, as well as of the axial heat conductivity, in the temperature adjusting plate 7 of the present invention. If the temperature adjusting plate consists of electrically conductive material, the use of insulating spacers 15, for example of beryllium oxide, may be advantageous.

FIG. 2 also shown dimensions $Z_1$ to $Z_8$ and $d_k$, $d_t$, $D_a$, $d_a$ and $d_H$, which follow directly from the figure. These dimensions apply, in the same sense, to the other embodiments, for example FIG. 1.

$Z_1$ is the upper surface of the semiconductor discs 5 to be coated, as well as the precipitation surface.
$Z_2$ is the upper surface of the bottom of the reaction vessel 2.
$Z_3$ is the lower surface of the reaction vessel 2.
$Z_4$ is the upper surface of the temperature adjusting plate 7.
$Z_5$ is the lower surface of the temperature adjusting plate 7.
$Z_6$ is the upper surface of the heater 6.
$Z_7$ is the lower surface of the heater 6.
$Z_8$ is the bottom of the downwardly bent periphery of the temperature adjsuting plate 7.
$d_H$ is the outer diameter of the heater.
$d_a$ is the inner diameter of the downwardly bent periphery of the temperature adjusting plate 7.
$D_a$ is the outer diameter of the temperature adjusting plate 7.
$d_t$ is the inside diameter of the reaction vessel.
$d_k$ is the diameter of the total precipitation surface which is covered with the semiconductor discs being processed, for example silicon discs.

The following dimensional correlations apply generally.

$$|Z_1-Z_2| \leqq 0.15 \cdot d_H$$

$$d_k \leqq d_H : 1.1$$

$$d_k \geqq d_H : 1.25$$

(the smaller $d_k$, the more favorable will be the temperature distribution, However, if the dimensions are established to the extreme, the cost of the operation becomes uneconomical;

$$d_a \geqq (d_H + 2 \text{ mm.})$$

$$|D_a-d_a| \leqq 2/3 |Z_1-Z_7|$$

$$|Z_4-Z_6| \geqq a/3$$

(if the heating device is comprised of graphite);

$$|Z_7-Z_8| \leqq 0.1 \cdot d_H$$

$$d_H : 50 > |Z_6-Z_7| > 0$$

$$d_t \geqq (d_k + 5 \text{ mm.})$$

For a preferred embodiment: $d_t = 100$ mm.;

$$d_k = 93 \text{ mm};$$

$$d_H = 105 \text{ mm.}; d_a = 112 \text{ mm.}; D_a = 120 \text{ mm.};$$

$$|Z_1-Z_7| = 10 \text{ mm.}; |Z_2-Z_3| = 3 \text{ mm.}; |Z_3-Z_4| = 2 \text{ mm.};$$

$$|Z_4-Z_6| - 4 \text{ mm.}; |Z_6-Z_7| = 105 \text{ mm.}; |Z_7-Z_8| = 10 \text{ mm.}$$

Figure 4:
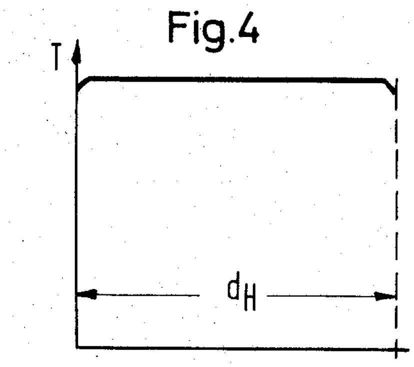
FIGS. 4 to 8 show various temperature distributions.

By observing the above optimum distances, one obtains a temperature distribution, as shown in FIG. 4, on the surface of the heating device 6, provided its coils are sufficiently close. If the temperature adjusting plate 7 is completely homogenous with respect to cross section and characteristics, that is it does not correspond to the teaching of the present invention, the temperature distribution at its surface is as shown in FIG. 5 with a temperature distribution at the location of the discs 5 being coated as seen in FIG. 6.

One sees clearly how the previous practice results in an inevitable temperature drop at the edge of the heater 6 and a corresponding considerable radial temperature drop at the locality of the discs 5 to be coated, placed at the bottom of the reaction vessel 2.

Figure 5:
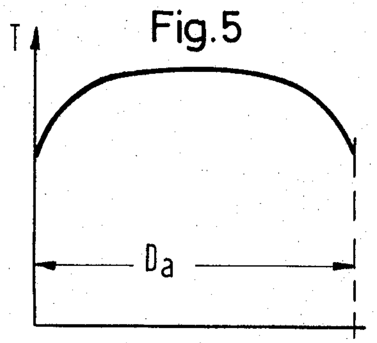
Figure 7:
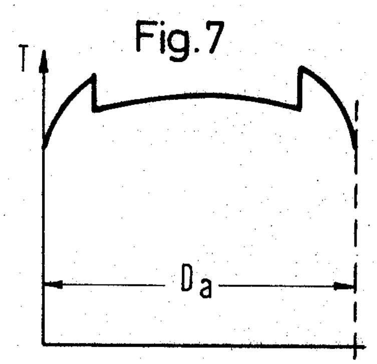
Figure 6:
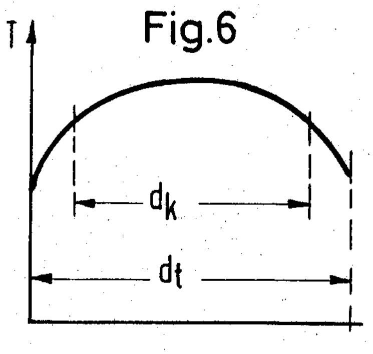
Figure 8:
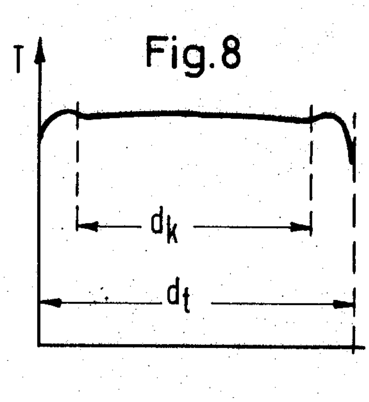

With a temperature adjusting plate, as in FIG. 3, the resultant temperature distribution obtained is, in accordance with FIG. 7, at the surface of the temperature adjusting plate 7, while the temperature distribution at the locality of the discs 5 to be coated, as seen in FIG. 8, is considerably more uniform than that of FIG. 5.

I claim:

1. An apparatus for thermal processing of disc shaped objects for use in semiconductors, whereby the discs being processed are arranged on the bottom of a treatment chamber and are heated to processing temperature by means of an electric heating device which is located beneath said bottom of said chamber, extends areally with its upper surface parallel to the discs being treated, a heating pot enclosing the electric heating device and the lower portion of the treatment chamber and structurally connects said electric heating device to said treatment chamber, the improvement which comprises a temperature adjusting plate, between heating device and the bottom of a processing vessel and extending at least with its middle portion parallel to the bottom of the processing vessel and so constructed that the axial heat flows which traverses the center portion of said adjusting device encounters a stronger impediment in the center of said parallel portion than at its periphery, while the radial heat flow proceeding from the interior to the outside encounters an impedence at least in some places.

2. The apparatus of claim 1, wherein the temperature adjusting plate which extends essentially parallel to the bottom of the processing vessel is bent downwardly at its peripheral portions and laterally surrounds the heating device.

3. The apparatus of claim 2, wherein the temperature adjusting plate has at least one butt joint which impedes the radial heat expansion.

4. The apparatus of claim 1, wherein the temperature adjusting plate has at least one butt joint which impedes the radial heat expansion, said abutting junction being in the shape of a cylindrical housing and traversing the entire thickness of the temperature adjusting plate.

5. The apparatus of claim 3, wherein the butt junction is at least in the center part of the temperature adjusting plate and impedes the axial heat current and preferably extends perpendicular to the symmetry axis of the temperature adjusting plate.

6. The apparatus in claim 3, wherein two materials contact each other at the butt joint in such a manner that the material closer to the axis of symmetry of the device has in the axial direction a lower heat conductivity than the material more remote to the axis of symmetry.

7. The apparatus of claim 5, wherein at least one of the materials which contact each other at the butt joint has in the axial direction a lower heat conductivity than the material which forms the peripheral portions of the temperature adjusting plate.

8. The apparatus of claim 1, wherein the material presenting the lesser impediment is graphite and the material presenting the stronger impediment is pyrographite.

9. The apparatus of claim 1, wherein the temperature adjusting plate is without a butt joint and comprises a homogeneous, radiation-shielding carbonaceous material which, measured axially, is thicker in its center than at its periphery.

10. The apparatus as in claim 3, wherein the materials adjacent the butt joint have the same heat conductance capacity.

11. The apparatus of claim 1, wherein the temperature adjusting plate is comprised of at least two portions which fit inside each other.

12. The apparatus of claim 11 wherein the two portions, fitting into each other, butt against one another along a cylindrical point.

13. The apaparatus of claim 11, wherein the temperature adjusting plate consists of an insert portion and a main portion which has a cylindrical central recess into which the disc shaped insert piece is fitted.

14. The apparatus of claim 13, wherein the insert is surrounded by a flat edge portion of the recess.

References Cited

UNITED STATES PATENTS

| | | | |
|---|---|---|---|
| 1,060,265 | 4/1913 | Lamb | 219—540 |
| 2,458,251 | 1/1949 | Challet | 219—540 X |
| 2,933,586 | 4/1960 | Schusterius | 219—530 X |
| 3,381,114 | 4/1968 | Nakanuma | 118—49.5 |
| 3,386,503 | 6/1968 | Corning et al. | 165—185 |

FOREIGN PATENTS

| | | |
|---|---|---|
| 119,540 | 2/1945 | Australia. |

VOLODYMYR Y. MAYEWSKY, Primary Examiner

U.S. Cl. X.R.

165—185; 219—462, 530, 540

PO-1050
(5/69)

UNITED STATES PATENT OFFICE
CERTIFICATE OF CORRECTION

Patent No. 3,505,499 Dated April 7, 1970

Inventor(s) Albert Walther

It is certified that error appears in the above-identified patent and that said Letters Patent are hereby corrected as shown below:

In the heading the German priority number and filing date should be added: Germany, filed April 7, 1967, S 109236 IVc/12g

SIGNED AND
SEALED

SEP 29 1970

(SEAL)
Attest:

Edward M. Fletcher, Jr.
Attesting Officer

WILLIAM E. SCHUYLER, JR.
Commissioner of Patents